United States Patent
Gong et al.

(10) Patent No.: US 10,283,871 B2
(45) Date of Patent: May 7, 2019

(54) RECONFIGURABLE ANTENNA ARRAY AND ASSOCIATED METHOD OF USE

(71) Applicant: University of Central Florida Research Foundation, Inc., Orlando, FL (US)

(72) Inventors: Xun Gong, Oviedo, FL (US); Mahmoud Shirazi, Orlando, FL (US); Tianjiao Li, Apopka, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 36 days.

(21) Appl. No.: 15/728,124

(22) Filed: Oct. 9, 2017

(65) Prior Publication Data
US 2018/0102593 A1    Apr. 12, 2018

Related U.S. Application Data (60) Provisional application No. 62/407,274, filed on Oct. 12, 2016.

(51) Int. Cl.
| | |
|---|---|
| *H01Q 13/10* | (2006.01) |
| *H01Q 21/06* | (2006.01) |
| *H01Q 1/48* | (2006.01) |
| *H04B 7/10* | (2017.01) |
| *H01Q 5/50* | (2015.01) |

(52) U.S. Cl.
CPC ......... *H01Q 13/103* (2013.01); *H01Q 21/064* (2013.01); *H01Q 1/48* (2013.01); *H01Q 5/50* (2015.01); *H04B 7/10* (2013.01)

(58) Field of Classification Search
CPC ...... H01Q 13/103; H01Q 21/064; H01Q 5/50; H01Q 1/48; H01Q 7/10
See application file for complete search history.

(56) References Cited

U.S. PATENT DOCUMENTS

| 8,373,609 B1 | 2/2013 | Dorsey et al. |
| 8,957,817 B2 | 2/2015 | Jiang et al. |
| 2011/0050536 A1 | 3/2011 | Shtatnov et al. |

OTHER PUBLICATIONS

Li and Gong. Single-Sided Radiation of a Fractal-Shaped Reconfigurable Dual-Band Slot-Ring Antenna Using Electromagnetic Band-Gap Surfaces. IEEE AP-S Int. Symp., Fajardo, Puerto Rico. Jun. 26-Jul. 1, 2016: 835-836.
Shirazi and Gong. Singly-Polarized Reconfigurable Slot-Ring Antenna/Array with Fractal Shapes. IEEE AP-S Int. Symp., Fajardo, Puerto Rico. Jun. 26-Jul. 1, 2016: 843-844.

(Continued)

*Primary Examiner* — Graham P Smith
(74) *Attorney, Agent, or Firm* — Molly L. Sauter; Smith & Hopen, P.A.

(57) ABSTRACT

A reconfigurable antenna array capable of utilizing a common antenna aperture which can cover a wide frequency range in a continuous way. With the basic antenna element based on a slot-ring and using a self similar structure approach and RE' switches, the antenna array operates without grating lobes. The antenna array exhibits polarization diversity and single-side radiation capability. When varactors are implemented into the array, the antenna array can cover the frequency range by continuously tuning the center frequency with a relatively narrow instantaneous bandwidth.

20 Claims, 8 Drawing Sheets

(56) References Cited

OTHER PUBLICATIONS

Li et al., S-band Continuously-tunable Slot-ring Antennas for Reconfigurable Antenna Array Applications. IEEE International Workshop on Antenna Technology. Cocoa Beach, FL,. Feb. 29-Mar. 2, 2016: 18-19.

Shirazi et al, A new design of reconfigurable slot-ring antenna using PIN diodes. IEEE AP-S Int. Symp., Vancouver, BC, Canada. Jul. 19-25, 2015: 2271-2272.

White and Rebeiz. Single- and dual-polarized tunable slot-ring antenna. IEEE Trans. Antennas Propag. 2009. vol. 57 (No. 1): 439-448.

RECONFIGURABLE ANTENNA ARRAY AND ASSOCIATED METHOD OF USE

CROSS REFERENCE TO RELATED APPLICATIONS

This application claims priority to U.S. Provisional Application No. 62/407,274 entitled "Reconfigurable Antenna Array and Associated Method of Use", filed Oct. 12, 2016, the contents of which are hereby incorporated by reference into this disclosure.

GOVERNMENT INTEREST STATEMENT

This invention was made with government support under HR0011-14-1-0003 awarded by the Defense Advanced Research Project Agency (DARPA). The government has certain rights in the invention.

BACKGROUND OF THE INVENTION

Antenna arrays are widely used in many military as well as civil applications. They are typically expensive to develop and the design cycles are long. Unfortunately, due to the vastly different personalities required for various applications, the technology developed for one project cannot be easily adapted to another one, causing a lot of waste in terms of time, effort, and money. Traditionally, antenna arrays are custom-designed for certain applications. This is mainly due to two reasons. First, there are numerous electrical parameters that need to be designed to address a specific application. In order to meet all the requirements, the optimized antenna physical structures are very different among diverse applications. As a result, the commonality between different antenna systems is rare. Second, the lack of good tuning mechanisms prevents antennas from being reconfigured to satisfy different personalities.

In the last decade, due to the popularity of the Cognitive Radio (CR) concept, a lot of developments in tunable antenna and radio frequency (RF) front-ends have been seen. These tunable antennas are often preferred over the traditional ultra-wideband approach because the tunable antenna can be designed to achieve a relatively narrower bandwidth, therefore, effectively rejecting the interference from other users and reducing unwanted noise. In theory, reconfigurable antennas should exhibit the ability to change many RF communication parameters, such as carrier frequency, bandwidth, polarization, radiation pattern, power level etc. However, current techniques are only capable of modifying one or two of these aforementioned parameters. Frequency tunability has been demonstrated using photoconductive switches, varactor diodes, integrated filtenna, PIN diodes, both varactors and PIN diodes, or mechanical rotors. Antennas with reconfigurable bandwidth, polarization, radiation main beam and radiation null have also been reported. Switchable carrier frequency and limited reconfigurable radiation patterns have been described. Both frequency and polarization reconfigurable antenna have been demonstrated. Albeit useful, the aforementioned technologies cannot be directly applied to antenna arrays, particularly due to the lack of the necessary agility required to provide digitally-interconnected building blocks from which larger systems can be formed.

In response to the need for reconfigurable antenna arrays which can adapt to different personalities, a pixel patch antenna has been designed using micro-actuators. Nevertheless, the frequency tuning range is rather limited. A similar technique, Pixel Addressable Reconfigurable Conformal Antenna (PARCA), in which the antenna substrate is divided into many pixels is known in the art. Under each pixel there is a mechanical actuator. By selectively raising or lowering each pixel, antennas of different sizes (which determines the frequency) and other parameters can be realized. While the technique has the advantage of high power-handling capabilities and high linearity, there are drawbacks associated with the technology. A large number of mechanical actuators are required, therefore increasing the cost and weight of the antenna system. The tuning speed is slow (on the order of milliseconds at the best). In addition, the lateral metal connection is achieved by mere mechanical contact, which could lead to reliability issues since good conductivity within the antenna surface is mandated. The limited choice of antenna type and feeding network (primarily patch antenna and inset microstrip feeding) is not sufficient to satisfy different personalities which require more than just frequency tuning. One alternative approach is to use switches to connect the pixelated patch antennas. For this configuration, the pixelated patch antenna elements are not moved up and down, but are instead connected laterally through a mesh of switches such as MEMS (Micro-Electromechanical Systems). By turning these switches ON and OFF, one can dynamically change the frequency, polarization, and bandwidth (possibly through the matching network). However, the large quantities of electronic switches required for this implementation will require a very expensive voltage controller in order to set the bias voltage for each switch. Moreover, when this pixelated antenna is reconfigured into an array, the mutual coupling between antenna elements could be large enough to cause scan blindness due to the closely-spaced pixelated elements, even when the switches are off. Similar to the mechanical actuator approach, the feeding of this antenna array is also very challenging to realize to satisfy the requirements for different personalities.

Accordingly, what is needed in the art is an improved reconfigurable antenna array that is adaptable to different personalities of communication, such as radar and electronic warfare (EW) systems.

SUMMARY OF INVENTION

In various embodiments, the present invention provides a reconfigurable antenna array that is able to realize a common antenna aperture which can cover a wide frequency range in a continuous way. The basic antenna element, in accordance with one embodiment, is based on a slot-ring. Using a self-similar structure approach and. RF switches, the proposed antenna enables an antenna array without grating lobes. The antenna array of the present invention exhibits polarization diversity and single-side radiation capability. When varactors are used, the antenna array can cover the frequency range by continuously tuning the center frequency with a relatively narrow instantaneous bandwidth. Alternatively, a fractal shape may be used in the antenna array to realize a full-band instantaneous bandwidth. In various embodiments, switches are used to change the band of operations and each frequency band has its own feeding lines.

In one embodiment, a reconfigurable antenna array in accordance with the present invention comprises, an electrically conductive ground plane having a top surface and a bottom surface, a continuous slot formed on the top surface of the electrically conductive ground plane and a plurality of switches positioned across the continuous slot. The plurality of switches are opened and/or closed to establish three different antennas. The first antenna includes a first plurality of square slot-ring antenna elements, wherein the first plurality of square slot-ring antenna elements are configured to operate in a first frequency band. The second antenna includes a second plurality of square slot-ring antenna elements, wherein each of the second plurality of square slot-ring antenna elements surrounds a portion of the first plurality of square slot-ring antenna elements and each one of the first plurality of square slot-ring antenna elements is positioned at a corner of one of the second plurality of square slot ring antenna elements and wherein the second plurality of square slot ring antenna elements are configured to operate in a second frequency band that is lower than the first frequency band. The third antenna includes a single square slot-ring antenna element surrounding the second plurality of square slot-ring antenna elements, wherein each one of the second plurality of square slot-ring antenna elements is positioned at a corner of the third square slot-ring antenna element and wherein the third square slot-ring antenna element is configured to operate in a third frequency band that is lower than the first frequency band and the second frequency band. The reconfigurable antenna array further includes, a first frequency feed network coupled to the first antenna, a second frequency feed network coupled to the second antenna and a third frequency feed network coupled to the third antenna.

In a specific embodiment of the reconfigurable antenna array, the first frequency band may be an X-band, the second frequency band may be a C-band and the third frequency band may be an S-band.

The reconfigurable antenna array of the present invention may further include, a first plurality of varactors to tune the first antenna to a desired frequency within the first frequency band, a second plurality of varactors to tune the second antenna to a desired frequency within the second frequency band and a third plurality of varactors to tune the third antenna to a desired frequency within the third frequency band.

In various embodiments, the first plurality of square slot-ring antenna elements of the reconfigurable antenna array forms a 4×4 array and the second plurality of square slot-ring antenna elements forms a 2×2 array.

In a specific embodiment, the reconfigurable antenna array of the present invention may further includes, a first plurality of fractal shapes formed in the top surface of the conductive ground plane, each of the first plurality of fractal shapes positioned to surround one of each of the first plurality of square slot-ring antenna elements and a second plurality of fractal shapes formed in the top surface of the conductive ground plane, each fractal shape positioned to surround one of the second plurality of slot-ring antenna elements.

In an additional embodiment, the present invention provides a method for reconfiguring an antenna array, which includes, an electrically conductive ground plane having a top surface and a bottom surface and a continuous slot formed on the top surface of the electrically conductive ground plane. The method includes, closing a first plurality of switches positioned across the continuous slot to establish a first antenna comprising a first plurality of square slot-ring antenna elements, the first plurality of square slot-ring antenna elements configured to operate in a first frequency band when ted by a first frequency feed network. The method further includes, opening the first plurality of switches and closing a second plurality of switches positioned across the continuous slot to establish a second antenna comprising a second plurality of square slot-ring antenna elements, each of the second plurality of square slot-ring antenna elements surrounding a portion of the first plurality of square slot-ring antenna elements, wherein each one of the first plurality of square slot-ring antenna elements is positioned at a corner of one of the second plurality of square slot ring antenna elements and wherein the second plurality of square slot ring antenna elements are configured to operate in a second frequency band that is lower than the first frequency band when fed by a second frequency feed network. The method further includes, opening the first plurality of switches and the second plurality to establish a third antenna comprising a single square slot-ring antenna element surrounding the second plurality of square slot-ring antenna elements, wherein each one of the second plurality of square slot-ring antenna elements is positioned at a corner of the third square slot-ring antenna element and wherein the third square slot-ring antenna element is configured to operate in a third frequency band that is lower than the first frequency band and the second frequency band when fed by a third frequency feed network.

In an addition embodiment, the method of the present invention further includes, tuning the first antenna to a desired frequency within the first frequency band using a first plurality of varactors positioned across the first plurality of square slot-ring antenna elements of the first antenna, tuning the second antenna to a desired frequency within the second frequency band using a second plurality of varactors positioned across the second plurality of square slot-ring antenna elements of the second antenna and tuning the third antenna to a desired frequency within the third frequency band using a third plurality of varactors positioned across the third square slot-ring antenna elements of the third antenna.

Accordingly, the present invention provides an improved reconfigurable antenna array and associated method of use that is adaptable to different requirements of various communication systems.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications, and equivalents, which may be included within the spirit and scope of the various embodiments as defined by the appended claims. Furthermore, in this Detailed Description of the Invention, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In various embodiments, the present invention provides an antenna array that is flexible enough to modify its center frequency, bandwidth, polarization, power level, scan angle and beam characteristics, thereby defining the personalities for different applications of the antenna array. With the goal of realizing an electrically-large array, the specific antenna element pattern and gain is considered unimportant, although radiating towards the boresight and exhibiting relatively broad beam width is preferred. The gain of the antenna array will be ultimately determined by the physical size of the entire array. It is also assumed that the amplitude and phase of the current on the antenna elements will be provided by the application-specific T/R (Transmit/Receive) modules for beamforming, due to the popularity of active phased array antenna architectures.

Therefore, the reconfigurable electromagnetic (EM) interface of the present invention focuses on the frequency, bandwidth, polarization, and power considerations. In addition, the chosen antenna type should exhibit small mutual coupling levels between antenna elements. It is desirable that the spacing between antenna elements be less than half free-space wavelength at all frequencies of operation. These two conditions are required for ±60 degree scanning, wherein the scan blindness and grating lobes become most severe.

The reconfigurability of the antenna array of the present invention is achieved through switches and varactors using either semiconductor or MEMS techniques. The scan rate of the radiation beam is ultimately determined by the tuning speed of these tuning elements within the EM interface. In addition, the antenna array structure in accordance with the present invention takes advantage of ever-improving semiconductor and/or MEMS technologies, without a major redesign of the antenna array. As a result, the antenna array embodiments in accordance with the present invention are able to achieve better power-handling capabilities and higher linearity by simply swapping out the tuning elements. It is also desirable that the proposed technology be easily tailored to realize reconfigurable antenna arrays at higher frequencies such as $K_u$, K, and $K_a$ bands.

The proposed reconfigurable antenna array can adapt to different personalities in terms of frequency, bandwidth, and polarization. In addition, the reconfigurable antenna array is upgradable in terms of power handling capability and linearity requirements. The size, weight, and power (SWaP) of the proposed antenna array is small. The tuning and switching control mechanism is far simpler than alternative techniques having a similar level of configurability.

Figure 1A:
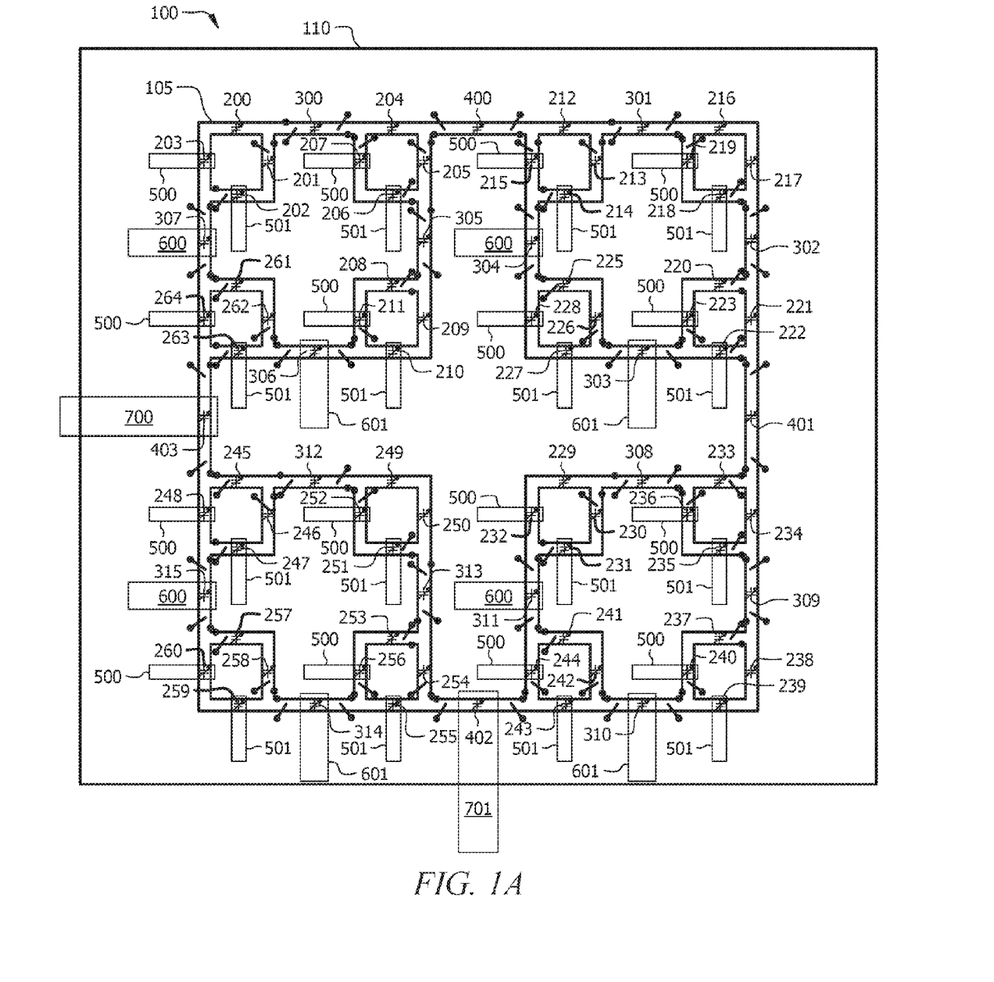
FIG. 1A is a first illustration of a pixelated and reconfigurable slot-ring antenna array covering S band, C band, and X band, in accordance with an embodiment of the present invention.
Figure 1B:
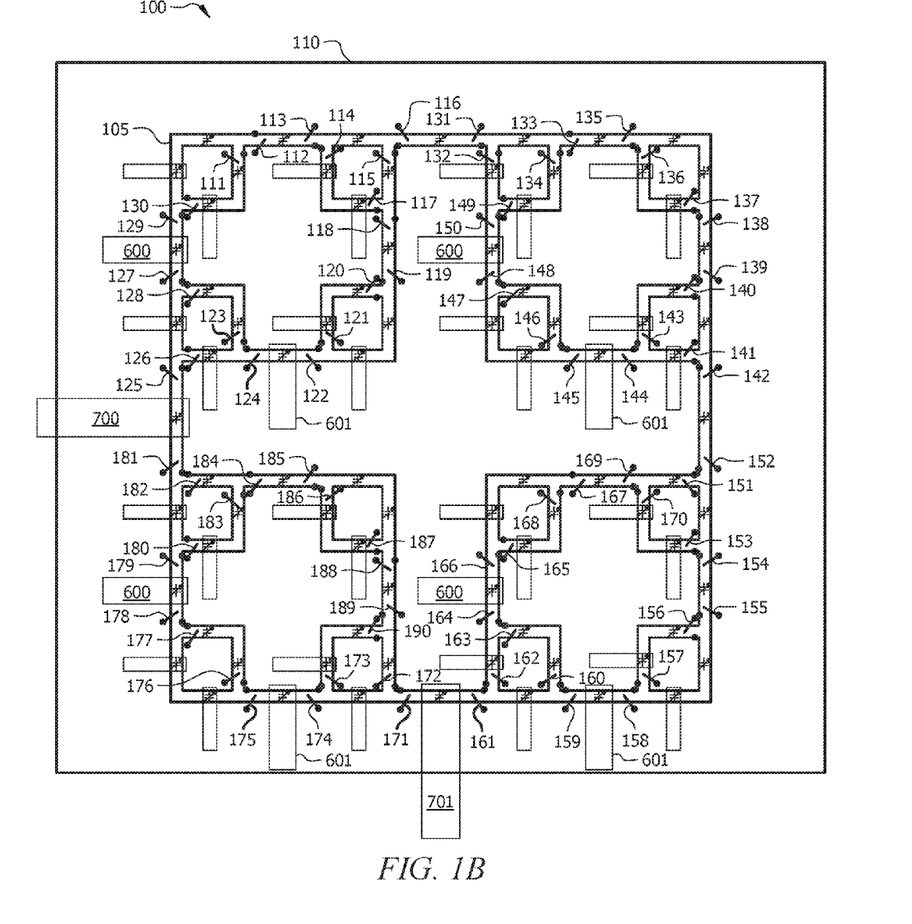
FIG. 1B is a second illustration of a pixelated and reconfigurable slot-ring antenna array covering S band, C band, and X band, in accordance with an embodiment of the present invention.

FIG. 1A and FIG. 1B illustrate the proposed pixelated and reconfigurable slot-ring antenna array 100 in accordance with an embodiment of the present invention. In this embodiment, the same physical aperture incorporates antenna or antenna arrays covering S-bands, C-bands and X-bands, without a gap in frequency. In general S-band includes frequencies between 2 GHz and 4 GHz, C-band includes frequencies from 4 GHz to 8 GHz and X-band includes frequencies from 8 GHz to 12 GHz.

With reference to FIG. 1A, in various embodiments, the reconfigurable slot-ring antenna array 100 includes a large area conductive ground plane 110, having a top surface and a bottom surface, and a continuous loop area which is the slot 105 cut into the top surface of the conductive ground plane 110. As shown in FIG. 1A, microstrip lines positioned on the bottom side of the antenna substrate 110 are used to feed the signals into the antenna through contact vias (not shown). As shown in FIG. 1A, there are three sets of different feed lines, X-band horizontal polarization feed lines 500 and X-band vertical polarization feed lines 501, C-band horizontal polarization feed lines 600 and C-band vertical polarization feed lines 601, an S-band horizontal polarization feed line 700 and an S-band vertical polarization feed line 701. The reconfigurable antenna array additionally includes a separate set of varactors for each band, i.e. X-band varactors 200-264, C-band varactors 300-315, and S-band varactors 400-403. The varactors are strategically placed at locations along the slot 110 to enable continuous frequency tuning of the antenna elements within the designed frequency range. The plurality of varactors may be of the same or different values.

With reference to FIG. 1B, the reconfigurable antenna array 100 additionally includes a plurality of switches 111-190 positioned across the slot 105 on the top surface of the conductive ground plane 110. In one embodiment the plurality of switches 111-190 may be PIN diodes. As shown in FIG. 1B, in the present invention there are a plurality of switches positioned to be open or closed across the slot 105 to create the various antenna embodiments. In one embodiment, a first set of switches 112, 113, 116, 118, 119, 122, 124, 125, 127, 129, 131, 133, 135, 138, 139, 142, 144, 145,

148, 150, 151, 154, 155, 158, 159, 161, 164, 166, 167, 168, 169, 171, 174, 175, 178, 179, 181, 184, 185, 188, 189 may be closed, and the remaining switches opened, to configure the reconfigurable antenna array 100 into a 4×4 X-band antenna array. In a second embodiment, a second set of switches 111, 114, 116, 117, 120, 121, 123, 125, 128, 130, 131, 134, 136, 137, 140, 142, 143, 146, 147, 149, 151, 153, 156, 157, 160, 161, 163, 165, 168, 170, 171, 173, 176, 177, 180, 181, 183, 186, 187, 190 may be closed, and the remaining switches opened, to configure the reconfigurable antenna array 100 into a 2×2 C-band antenna array. In a third embodiment, a third set of switches 111, 114, 115, 126, 128, 130, 132, 134, 136, 137, 140, 141, 151, 153, 156, 157, 160, 162, 172, 173, 176, 177, 180, 182 may be closed, and the remaining switches opened, to configure the reconfigurable antenna array 100 into a single S-band antenna. The proposed antenna array can adapt to different personalities in terms of frequency, bandwidth, and polarization. In addition, it is upgradable in terms of power handling capability and linearity requirement. The size, weight, and power (SWaP) of the proposed antenna array is small. The tuning/switching control mechanism is far simpler than alternative techniques with similar level of reconfigurability.

Figure 2A:
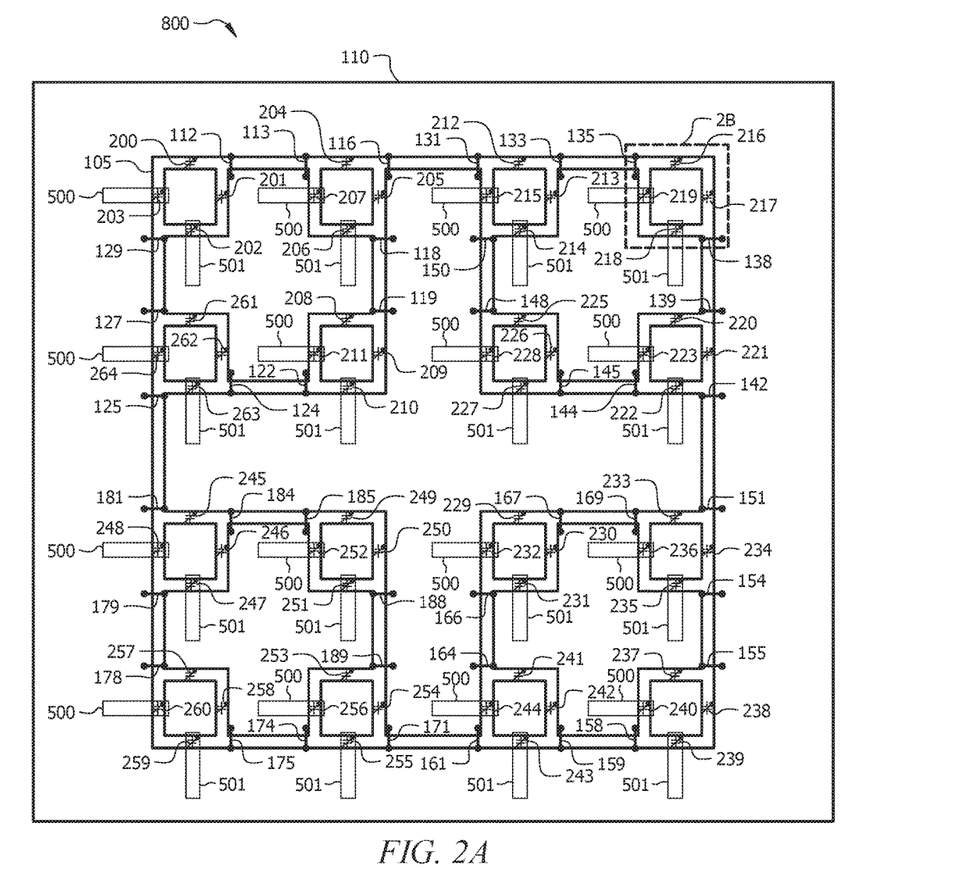
FIG. 2A is an illustration of a pixelated and reconfigurable slot-ring antenna array operating in an X-band mode, in accordance with an embodiment of the present invention.

As shown in FIG. 2A, in one embodiment of the present invention, a first antenna 800 comprising a first plurality of square slot-ring antenna elements established in the slot 105 is illustrated. The first plurality of square slot-ring antenna elements are configured to operate in a first frequency band, which in a particular embodiment may be an X-band.

In the exemplary embodiment of FIG. 2A, a reconfigurable antenna array 800 operating in an X-band operation mode is illustrated in which a first plurality of switches 112, 113, 116, 118, 119, 122, 124, 125, 127, 129, 131, 133, 135, 138, 139, 142, 144, 145, 148, 150, 151, 154, 155, 158, 159, 161, 164, 1.66, 167, 168, 169, 171, 174, 175, 178, 1.79, 181, 184, 185, 188, 189 are positioned in the "ON" state (electrically shorted to cross over the slot 105). Closing the first plurality of switches 112, 113, 116, 118, 119, 122, 124, 125, 127, 129, 131, 133, 135, 138, 139, 142, 144, 145, 148, 150, 151, 154, 155, 158, 159, 161, 164, 166, 167, 168, 169, 171, 174, 175, 178, 179, 181, 184, 185, 188, 189, and leaving the remaining switches in the "OFF" or open state, configures the reconfigurable antenna array 100 into a 4×4 slot-ring antenna array 800 as illustrated in FIG. 2A. A second plurality of switches and a third plurality of switches, which are positioned in the "OFF" state (electrically open), have been omitted in FIG. 2A, for clarity purposes. In addition, while the 16 X-band horizontal feed lines feed lines 500 and the 16 X-band vertical feed lines 501 are shown, the feed lines corresponding to the C-band operation mode and the S-band operation mode have also been omitted in FIG. 2A, for clarity purposes.

In the exemplary embodiment of FIG. 2A, each of the first plurality of switches 112, 113, 116, 118, 119, 122, 124, 125, 127, 129, 131, 133, 135, 138, 139, 142, 144, 145, 148, 150, 151, 154, 155, 158, 159, 161, 164, 166, 167, 168, 169, 171, 174, 175, 178, 1.79, 181, 184, 185, 188, 189 are closed, thereby effectively turning the reconfigurable antenna array into a 4×4 slot-ring antenna array 800 comprising 16 X-hand individual square slot-ring antenna elements on the top surface of conductive ground plane 110. The varactors 200-264 positioned within the antenna elements of the 4×4 array are used to tune the antenna array 800. Only the varactors 200-264 used in the tuning of the X-band slot-ring antenna array are illustrated in FIG. 2A, although it is understood that the C-band varactors 300-315 and the S-band varactors 400-403 are still present in the array.

Figure 2B:
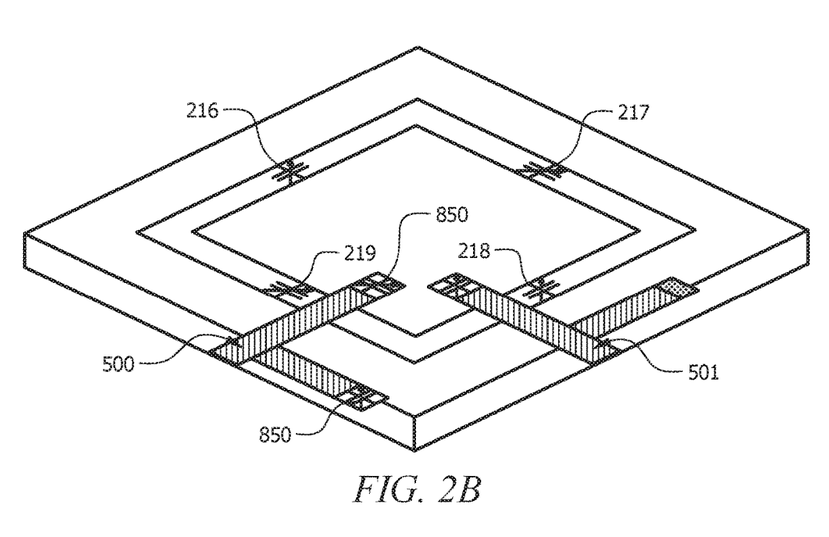
FIG. 2B is an exploded view of one of the antenna elements of the array of FIG. 2A.

FIG. 2B illustrates the geometry of one of the 16 X-band antenna elements of the 4×4 antenna array 800. As shown, each of the 16 X-hand antenna elements of the 4×4 antenna array includes an X-band horizontal feed line 500, an X-band vertical feed line 501, and four varactors 216, 217, 218, 219. The X-band feed lines 500, 501 may include additional varactors 850.

Due to the slot-ring antenna structure, the perimeter of the slot-ring antenna is one guided wavelength long. Therefore, each side of the slot-ring antenna is approximately one quarter guided wavelength long, without varactor loading. Therefore, it is very easy to realize free-space half wavelength spacing to avoid grating lobes at large scan angles. When the varactor values are increased, the frequency of the slot-ring antenna goes down, making the spacing between antenna elements even smaller in terms of electrical length. In addition, varactors can be placed inside slots to tune the center frequency in an octave bandwidth. To maintain the symmetry, varactors are placed in pairs. For example, the varactors 850 which are on the same line as the X-band vertical pol feeding microstrip line 501 as shown in FIG. 2B are used to control the center frequency of the vertical polarization.

The square shape of the slot ring also implies that there are two degenerate modes which can be independently excited inside the slot 105, i.e. V (vertical) and H (horizontal) polarization states, respectively. It is known that these two polarizations can be independently controlled with approximately 20-dB isolation between the two ports 500, 501. Therefore, single-polarization, dual polarization, or circular-polarization states can be achieved by simply feeding the two ports 500, 501 with the appropriate amplitude and phase, which are from the T/R (Transmit/Receive) module. Additionally, the slot-ring antenna bandwidth can be modified using a tunable matching network. The proposed slot-ring antenna geometry allows the upgrade of these tuning and/or switching elements without re-designing the entire antenna structure. If a better (in terms of power handling and linearity) tuning/switching element replaces a previous version, the power handling and linearity of this reconfigurable EM interface are automatically enhanced.

Figure 3A:
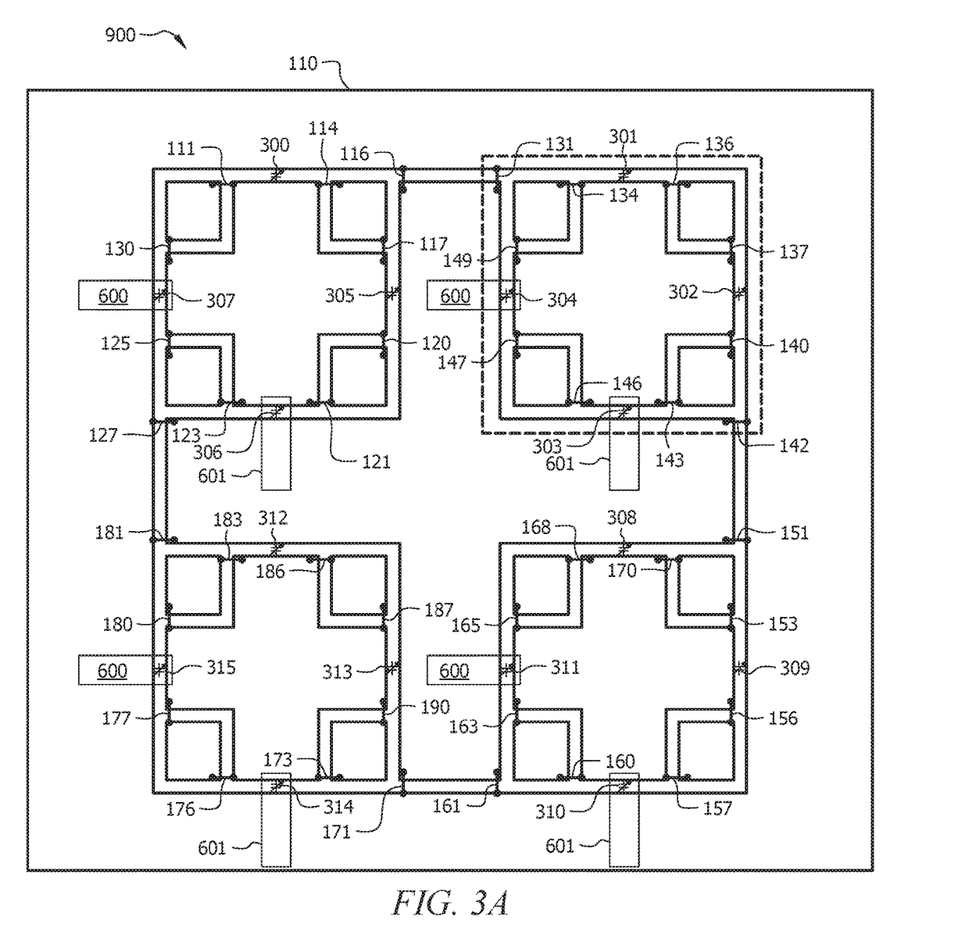
FIG. 3A is an illustration of a pixelated and reconfigurable slot-ring antenna array operating in a C-band mode, in accordance with an embodiment of the present invention.

With reference to FIG. 3A, a second antenna 900 comprising a second plurality of square slot-ring antenna elements is illustrated. In the second antenna array, each of the second plurality of square slot-ring antenna elements surrounding a portion of the first plurality of square slot-ring antenna elements from the 4×4 array and each one of the first plurality of square slot-ring antenna elements is positioned at a corner of one of the second plurality of square slot ring antenna elements. In operation, the second plurality of square slot-ring antenna elements are configured to operate in a second frequency band that is lower than the first frequency band. In a particular embodiment, the second plurality of square slot-ring antenna elements are configured to operation in a C-band operation mode which is a lower frequency band than the X-band operation mode of the 4×4 antenna array of FIG. 2A.

In the embodiment of FIG. 3A, the plurality of switches 111-190 of the antenna array are configured to realize a single tunable S-band antenna element by closing a second set of switches 111, 114, 116, 117, 120, 121, 123, 125, 128, 130, 131, 134, 136, 137, 140, 142, 143, 146, 147, 149, 151, 153, 156, 157, 160, 161, 163, 165, 168, 170, 171, 173, 176, 177, 180, 181, 183, 186, 187, 190 and leaving the remaining switches open to configure the reconfigurable antenna array into realize a 2×2 antenna array 900. The C-band horizontal feed network 600 and the C-band vertical feed network 601 are used to feed the C-band signals. The varactors 300-315 positioned within the antenna elements of the 2×2 array are used to tune the antenna array 900. Only the varactors 300-315 used in the tuning of the C-band slot-ring antenna array are illustrated in FIG. 3A, although it is understood that the X-band varactors 200-264 and the S-band varactors 400-403 are still present in the array.

Figure 3B:
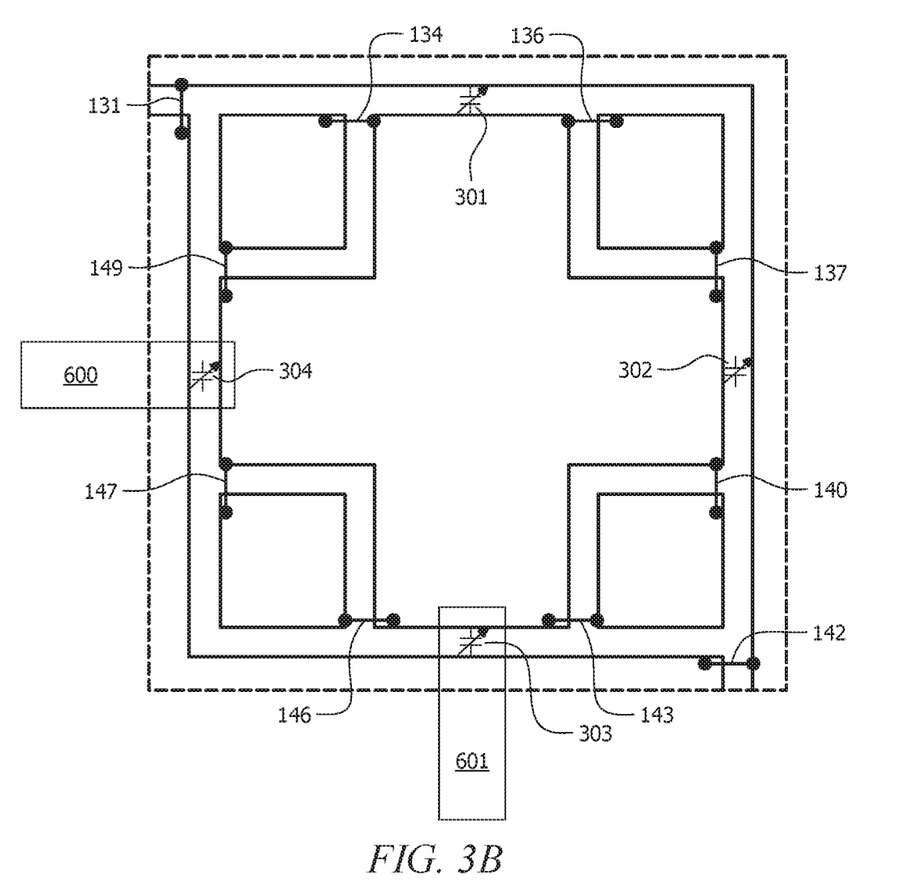
FIG. 3B is an exploded view of one of the antenna elements of the array of FIG. 3A.

FIG. 3B illustrates the geometry of one of the 4 C-band antenna elements of the 2×2 antenna array 900. As shown, each of the 4 C-band antenna elements of the 2×2 antenna array includes an C-band horizontal feed line 600, an C-band vertical feed line 601, and four varactors 301, 302, 303, 304.

The operation of the antenna array in a C-band frequency range is analogous to the X-band case, with a dimensional scaling. Closing the second plurality of switches 111, 114, 116, 117, 120, 121, 123, 125, 128, 130, 131, 134, 136, 137, 140, 142, 143, 146, 147, 149, 151, 153, 156, 157, 160, 161, 163, 165, 168, 170, 171, 173, 176, 177, 180, 181, 183, 186, 187, 190 configures only the larger square slot-rings to function as antenna elements, as shown in FIG. 313. As shown in FIG. 313, a different set of varactors 301, 302, 303, 304 are used to tune the center frequency for the C-band operation mode and the C-band horizontal microstrip line 600 and the C-band vertical microstrip 601 are used to feed the C-band signals.

Figure 4:
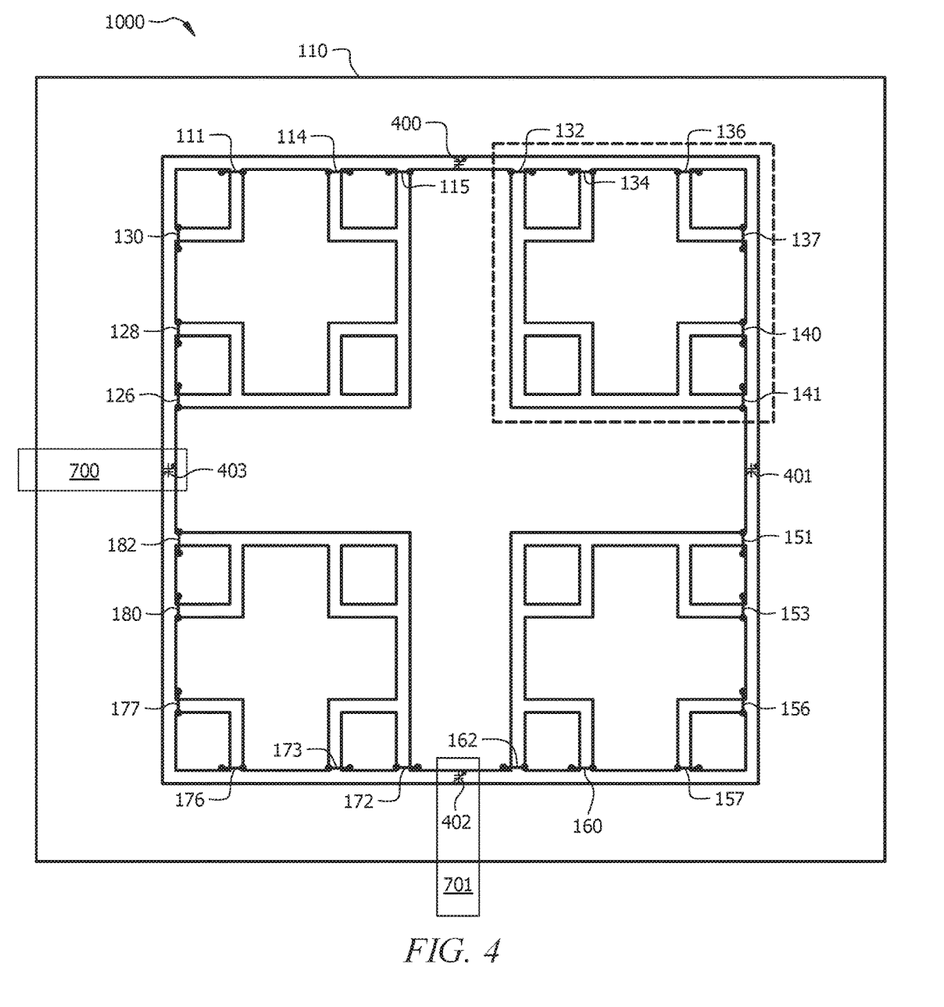
FIG. 4 is an illustration of a pixelated and reconfigurable slot-ring antenna array operating in an S-band operation mode, in accordance with an embodiment of the present invention.

As shown in FIG. 4, in an additional embodiment of the present invention, a third antenna 1000 comprising a single square slot-ring antenna element surrounding the second plurality of square slot-ring antenna elements is formed in the slot 105. In the third antenna, each one of the second plurality of square slot-ring antenna elements is positioned at a corner of the square slot-ring antenna element of third square slot-ring antenna and the third square slot-ring antenna element is configured to operate in a third frequency band that is lower than the first frequency band and the second frequency band. In a particular embodiment, the third frequency band is an S-band frequency band, which is lower than the C-band frequency range of the 2×2 antenna array of FIG. 3A and lower than the X-band frequency range of the 4×4 antenna array of FIG. 2A.

The S-band operation mode of the reconfigurable antenna array is shown in FIG. 4. In this embodiment, the plurality of switches 111-190 of the antenna array are configured to realize a single tunable S-band antenna element by closing a third set of switches 111, 114, 115, 126, 128, 130, 132, 134, 136, 137, 140, 141, 151, 153, 156, 157, 160, 162, 172, 173, 176, 177, 180, 182 and leaving the remaining switches open. The S-band horizontal feed network 700 and the S-band vertical feed network 701 are used to feed the S-band signals A different set of varactors 400, 401, 402, 403 are used to tune the center frequency for S-band operation. Only the varactors 400-403 used in the tuning of the S-hand slot-ring antenna array are illustrated in FIG. 4A, although it is understood that the X-band varactors 200-264 and the C-band varactors 300-315 are still present in the array.

As described, the reconfigurable antenna array 100 of the present invention, illustrated in FIG. 1A can be configured into a 4×4 antenna array 800 comprising 16 individual antenna elements, as shown in FIG. 2A, a 2×2 antenna array 900 comprising 4 individual antenna elements, as shown in FIG. 3A, or a single antenna element 100 as shown in FIG. 4. The plurality of switches positioned to be opened or closed across the slot 105 are used to configure the antenna array into the desired configuration.

Figure 5A:
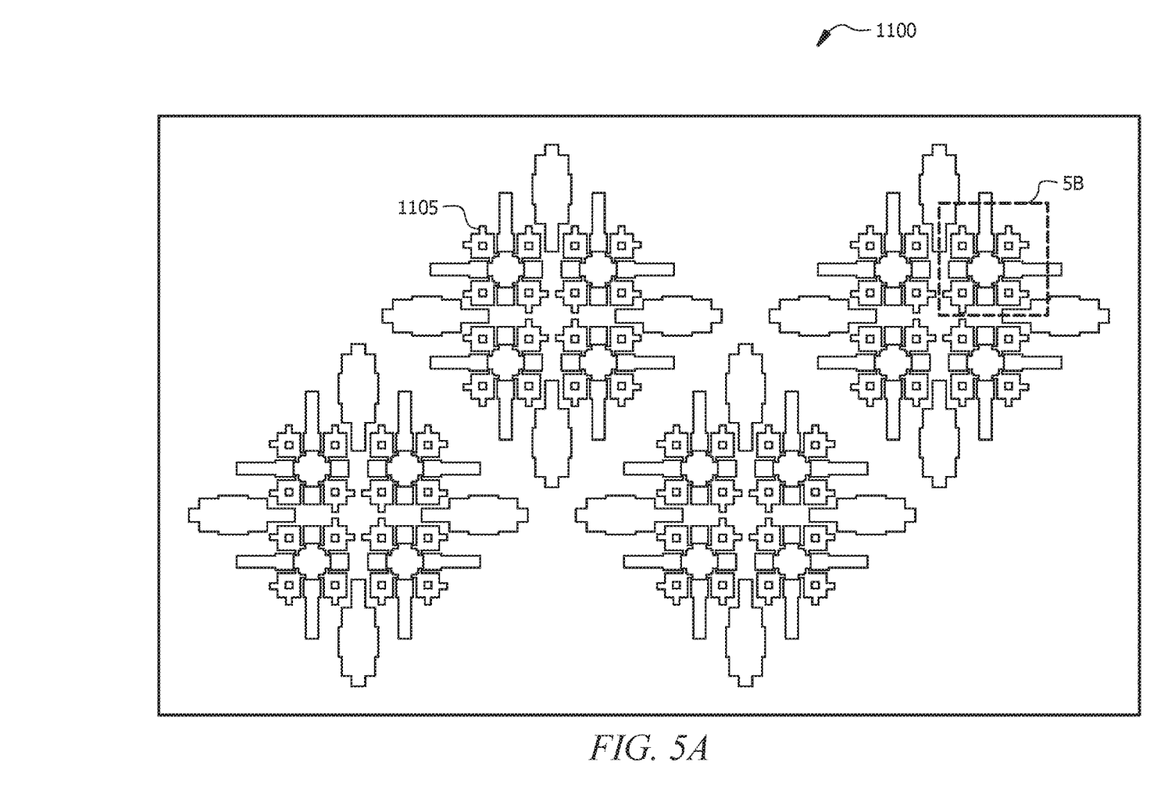
FIG. 5A is an illustration of a switchable tri-band slot-ring antenna with full-band instantaneous bandwidth, in accordance with an embodiment of the present invention.
Figure 5B:
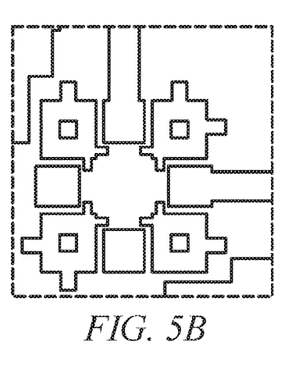
FIG. 5B is an exploded view of one of the antenna element of the array of FIG. 5A.

Alternatively, when wide instantaneous bandwidth (full band) is needed, a modified antenna array structure 1100 is proposed as shown in FIG. 5A. In FIG. 5A, four fractal-shaped, tri-band, slot-ring reconfigurable antenna arrays are illustrated and each of the reconfigurable antenna arrays can be configured as a 4×4 antenna array, a 2×2 antenna or a single antenna, utilizing a plurality of switches as previously described. An exploded view of one of the antenna elements of a 4×4 antenna array is illustrated in FIG. 5B.

The antenna array 1100 illustrated in FIG. 5A is a fractal-shaped, tri-band, slot-ring antenna array covering the S-band, C-band and X-band frequency range. In this embodiment, no varactors are used, but switches are still used to select the desirable frequency bands, as described in the previous embodiments. In this embodiment, the straight slots 105 from the previous embodiments are modified to a fractal shape 1105 to enhance the fractional bandwidth. Fractal shapes are incorporated into the antenna structure to significantly increase the bandwidth at all three operating modes. Good radiation parameters over the entire bandwidth are also obtained for both modes. In addition, the fractal shapes can be optimized using HFSS (High Frequency Electromagnetic Field Simulation) to create resonances close to the fundamental resonances of the slot-rings to enhance the bandwidth at all three frequency ranges.

As such, the present invention provides a reconfigurable antenna array that can adapt to different personalities in terms of frequency, bandwidth, and polarization utilizing a tuning and switching control mechanism that is far simpler than alternative techniques having a similar level of configurability.

It will be seen that the advantages set forth above, and those made apparent from the foregoing description, are efficiently attained and since certain changes may he made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described.

What is claimed is:
1. A reconfigurable antenna array comprising:
an electrically conductive ground plane having a top surface and a bottom surface;
a continuous slot formed on the top surface of the electrically conductive ground plane;
a plurality of switches positioned across the continuous slot, the plurality of switches and the continuous slot configured to establish;
a first antenna comprising a first plurality of square slot-ring antenna elements, the first plurality of square slot-ring antenna elements configured to operate in a first frequency band;
a second antenna comprising a second plurality of square slot-ring antenna elements, each of the second plurality of square slot-ring antenna elements surrounding a portion of the first plurality of square slot-ring antenna elements, wherein each one of the first plurality of square slot-ring antenna elements is positioned at a corner of one of the second plurality of square slot ring antenna elements and wherein the second plurality of square slot ring antenna elements are configured to operate in a second frequency band that is lower than the first frequency band;

a third antenna comprising a single square slot-ring antenna element surrounding the second plurality of square slot-ring antenna elements, wherein each one of the second plurality of square slot-ring antenna elements is positioned at a corner of the third square slot-ring antenna element and wherein the third square slot-ring antenna element is configured to operate in a third frequency band that is lower than the first frequency band and the second frequency band;

a first frequency feed network coupled to the first antenna;

a second frequency feed network coupled to the second antenna; and a third frequency feed network coupled to the third antenna.

2. The reconfigurable antenna array of claim 1, further comprising a first plurality of varactors, each of the first plurality of varactors coupled across one of the first plurality of square slot-ring antenna elements of the first antenna, the first plurality of varactors to tune the first antenna to a desired frequency within the first frequency band.

3. The reconfigurable antenna array of claim 1, further comprising a second plurality of varactors, each of the second plurality of varactors coupled across one of the second plurality of square slot-ring antenna elements of the second antenna, the second plurality of varactors to tune the second antenna to a desired frequency within the second frequency band.

4. The reconfigurable antenna array of claim 1, further comprising a third plurality of varactors, each of the third plurality of varactors coupled across the square slot-ring antenna element of the third antenna, the third plurality of varactors to tune the third antenna to a desired frequency within the third frequency band.

5. The reconfigurable antenna array of claim 1, wherein the first plurality of square slot-ring antenna elements forms a 4×4 array.

6. The reconfigurable antenna array of claim 1, wherein the second plurality of square slot-ring antenna elements forms a 2×2 array.

7. The reconfigurable antenna array of claim 1, wherein the first frequency band is an X-band, the second frequency band is a C-band and the third frequency band is an S-band.

8. The reconfigurable antenna array of claim 1, further comprising a first plurality of fractal shapes formed in the top surface of the conductive ground plane, each of the first plurality of fractal shapes positioned to surround one of each of the first plurality of square slot-ring antenna elements.

9. The reconfigurable antenna array of claim 1, further comprising a second plurality of fractal shapes formed in the top surface of the conductive ground plane, each fractal shape positioned to surround one of the second plurality of slot-ring antenna elements.

10. A reconfigurable antenna array comprising:

an electrically conductive ground plane having a top surface and a bottom surface;

a continuous slot formed on the top surface of the electrically conductive ground plane;

a plurality of switches positioned across the continuous slot, the plurality of switches and the continuous slot configured to establish;

a first antenna comprising a 4×4 array of square slot-ring antenna elements, the 4×4 array of square slot-ring antenna elements configured to operate in a first frequency band;

a second antenna comprising a 2×2 array of square slot-ring antenna elements, each of the 2×2 array of square slot-ring antenna elements surrounding 4 of the 4×4 array of square slot-ring antenna elements, wherein each square slot-ring antenna elements of the 4×4 array of square slot-ring antenna elements is positioned at a corner of one of the square slot-ring antenna elements of the 2×2 array of square slot ring antenna elements and wherein the 2×2 array of square slot ring antenna elements are configured to operate in a second frequency band that is lower than the first frequency band;

a third antenna comprising a single square slot-ring antenna element surrounding the 2×2 array of square slot-ring antenna elements, wherein each square slot-ring antenna elements of the 2×2 array of square slot-ring antenna elements is positioned at a corner of the third square slot-ring antenna element and wherein the third square slot-ring antenna element is configured to operate in a third frequency band that is lower than the first frequency band and the second frequency band;

a first frequency feed network coupled to the first antenna;

a second frequency feed network coupled to the second antenna; and a third frequency feed network coupled to the third antenna.

11. The reconfigurable antenna array of claim 10, further comprising a first plurality of varactors, each of the first plurality of varactors coupled across one of the first plurality of square slot-ring antenna elements of the first antenna, the first plurality of varactors to tune the first antenna to a desired frequency within the first frequency band.

12. The reconfigurable antenna array of claim 10, further comprising a second plurality of varactors, each of the second plurality of varactors coupled across one of the second plurality of square slot-ring antenna elements of the second antenna, the second plurality of varactors to tune the second antenna to a desired frequency within the second frequency band.

13. The reconfigurable antenna array of claim 10, further comprising a third plurality of varactors, each of the third plurality of varactors coupled across the square slot-ring antenna element of the third antenna, the third plurality of varactors to tune the third antenna to a desired frequency within the third frequency band.

14. The reconfigurable antenna array of claim 10, wherein the first frequency band is an X-band, the second frequency band is a C-band and the third frequency band is an S-band.

15. The reconfigurable antenna array of claim 10, further comprising a first plurality of fractal shapes formed in the top surface of the conductive ground plane, each of the first plurality of fractal shapes positioned to surround one of each of the first plurality of square slot-ring antenna elements.

16. The reconfigurable antenna array of claim 10, further comprising a second plurality of fractal shapes formed in the top surface of the conductive ground plane, each fractal shape positioned to surround one of the second plurality of slot-ring antenna elements.

17. A method for reconfiguring an antenna array, the antenna array comprising an electrically conductive ground plane having a top surface and a bottom surface and a continuous slot formed on the top surface of the electrically conductive ground plane, the method comprising:

closing a first plurality of switches positioned across the continuous slot to establish a first antenna comprising a first plurality of square slot-ring antenna elements, the first plurality of square slot-ring antenna elements configured to operate in a first frequency band when fed by a first frequency feed network;

opening the first plurality of switches and closing a second plurality of switches positioned across the continuous slot to establish a second antenna comprising a second plurality of square slot-ring antenna elements, each of the second plurality of square slot-ring antenna elements surrounding a portion of the first plurality of square slot-ring antenna elements, wherein each one of the first plurality of square slot-ring antenna elements is positioned at a corner of one of the second plurality of square slot ring antenna elements and wherein the second plurality of square slot ring antenna elements are configured to operate in a second frequency band that is lower than the first frequency band when fed by a second frequency feed network; and opening the first plurality of switches and the second plurality to establish a third antenna comprising a single square slot-ring antenna element surrounding the second plurality of square slot-ring antenna elements, wherein each one of the second plurality of square slot-ring antenna elements is positioned at a corner of the third square slot-ring antenna element and wherein the third square slot-ring antenna element is configured to operate in a third frequency band that is lower than the first frequency band and the second frequency band when fed by a third frequency feed network.

18. The method of claim 17, further comprising:

tuning the first antenna to a desired frequency within the first frequency band using a first plurality of varactors positioned across the first plurality of square slot-ring antenna elements of the first antenna;

tuning the second antenna to a desired frequency within the second frequency band using a second plurality of varactors positioned across the second plurality of square slot-ring antenna elements of the second antenna; and tuning the third antenna to a desired frequency within the third frequency band using a third plurality of varactors positioned across the third square slot-ring antenna elements of the third antenna.

19. The method of claim 17, wherein the first plurality of square slot-ring antenna elements forms a 4×4 array and the second plurality of square slot-ring antenna elements forms a 2×2 array.

20. The method of claim 17, wherein the first frequency band is an X-band, the second frequency band is a C-band and the third frequency band is an S-band.

* * * * *